US012559119B2

(12) United States Patent
Kuehner et al.

(10) Patent No.: US 12,559,119 B2
(45) Date of Patent: Feb. 24, 2026

(54) INCREASING OPERATOR VIGILANCE BY MODIFYING LONGITUDINAL VEHICLE DYNAMICS

(71) Applicant: WOVEN BY TOYOTA, INC., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 310 days.

(21) Appl. No.: 18/085,514

(22) Filed: Dec. 20, 2022

(65) Prior Publication Data

US 2024/0199050 A1 Jun. 20, 2024

(51) Int. Cl.
B60W 50/14 (2020.01)
B60W 60/00 (2020.01)

(52) U.S. Cl.
CPC ........ B60W 50/14 (2013.01); B60W 60/0053 (2020.02); B60W 2556/45 (2020.02); B60W 2720/106 (2013.01)

(58) Field of Classification Search
CPC ............. B60W 50/14; B60W 50/0097; B60W 60/0053; B60W 2556/45; B60W 2556/50; B60W 2720/106; B60W 2050/143; B60W 2520/105; B60W 2554/408
USPC .......................................................... 701/24
See application file for complete search history.

(56) References Cited

U.S. PATENT DOCUMENTS

| | | | |
|---|---|---|---|
| 9,925,872 B1 | 3/2018 | Alasry | |
| 10,095,228 B1 | 10/2018 | Kuffner, Jr. | |
| 10,513,273 B1 | 12/2019 | Stark | |
| 11,225,266 B2 | 1/2022 | Domeyer | |
| 2006/0244632 A1 | 11/2006 | Corcoran, III | |
| 2018/0113454 A1* | 4/2018 | Emura | B60W 50/14 |
| 2018/0173227 A1 | 6/2018 | Mukai | |
| 2018/0297586 A1* | 10/2018 | Kim | A61B 5/02405 |
| 2018/0354530 A1* | 12/2018 | Freund | B60W 50/0097 |
| 2018/0370542 A1 | 12/2018 | Braunagel | |
| 2019/0018409 A1* | 1/2019 | Nickolaou | B60W 50/16 |
| 2019/0111944 A1 | 4/2019 | Nagahashi | |
| 2020/0039535 A1 | 2/2020 | Marberger | |
| 2020/0090426 A1* | 3/2020 | Barnes | G06N 5/025 |
| 2021/0046946 A1 | 2/2021 | Nemec | |

(Continued)

FOREIGN PATENT DOCUMENTS

| | | |
|---|---|---|
| CN | 109637261 | 4/2019 |
| CN | 114454895 | 5/2022 |
| DE | 112009002690 | 10/2012 |

(Continued)

OTHER PUBLICATIONS

Liu et al., "A Gradual Takeover Strategy of the Active Safety System," arXiv:1910.04323v2, Nov. 12, 2020, 25 pages (https://doi.org/10.48550/arXiv.1910.04323).

*Primary Examiner* — Andrew R Dyer
(74) *Attorney, Agent, or Firm* — SHEPPARD, MULLIN, RICHTER & HAMPTON LLP; Daniel N. Yannuzzi

(57) ABSTRACT

Systems and methods are provided for modulating longitudinal vehicle dynamics according to a calculated probability of future unplanned disengagement of a driving automation system. In particular, some embodiments aim to alert drivers of both a likelihood of unplanned disengagement, as well as a source of unplanned disengagement.

11 Claims, 9 Drawing Sheets

(56) References Cited

U.S. PATENT DOCUMENTS

2021/0055727 A1\*  2/2021  Goldman-Shenhar .......................
                                                  G06F 18/23
2021/0080967 A1\*  3/2021  Pettinger ...............  B60W 30/06

FOREIGN PATENT DOCUMENTS

EP        2613958        7/2013
EP        3808619  A1    4/2021
JP        6936107  X     9/2021

\* cited by examiner

DRIVING AUTOMATION SYSTEM ACTIVATION 401

REC. SENSOR/DATABASE DATA 402

CALC. DISENGAGEMENT PROB. 403

COMPARE DISENG. PROB. WITH THRESHOLDS 404

DET. TYPE, MAGNITUDE, AND PATTERN OF LVD MOD.
405

APPLY LVD MOD. 406

INCREASING OPERATOR VIGILANCE BY MODIFYING LONGITUDINAL VEHICLE DYNAMICS

TECHNICAL FIELD

The present disclosure relates generally to automotive system and technologies, and more particularly, some examples relate to a system of warning an occupant of a vehicle incorporating advanced driver-assistance systems (ADAS) or advanced driving system (ADS), collectively referred to as driving automation systems, of a likelihood that the driving automation system will be fully or partially disengaged. More specifically, some implementations may relate to modulating longitudinal vehicle dynamics (or speed) of the vehicle as a method of warning the occupant.

DESCRIPTION OF RELATED ART

In a vehicle employing a driving automation system, the role of vehicle operation is shared among an occupant(s), typically a driver of a vehicle, and the vehicle. Driving automation systems may categorize a suite of driving roles assumed by the vehicle into various autonomous driving levels. For instance, at autonomous driving level 2 ("L2") mode, the vehicle retains lateral (e.g., steering) and longitudinal (e.g., braking and acceleration) control, while the occupant(s) supervises vehicle operation. In other words, the role of the occupant(s) as a driver is never completely relinquished. During an emergency, the occupant(s) must take immediate control of both the lateral and longitudinal control to steer the vehicle to safety. In the context of this disclosure, the suite of driving roles assumed by the vehicle decreases with the autonomous driving level, i.e. a change from L2 to autonomous driving level 1 ("L1") entails a situation where the vehicle will be relinquishing driving roles for the occupant of the vehicle to assume. Driving automation levels and/or modes may be categorized according to any useful convention (e.g., targeting driving environment, target occupant experience).

BRIEF SUMMARY OF THE DISCLOSURE

According to various embodiments of the disclosed technology, a method of alerting an occupant of a vehicle employing a driving automation system, the method can comprise: receiving traffic contextual data; calculating a likelihood of unplanned disengagement of the driving automation system based on the traffic contextual data; and alerting the occupant of the unplanned disengagement of the driving automation system by modulating longitudinal vehicle dynamics of the vehicle in accordance with the calculated likelihood of unplanned disengagement of the driving automation system.

In some embodiments, modulating the longitudinal vehicle dynamics comprises at least one instance of acceleration or deceleration of the vehicle.

In some embodiments, modulating the longitudinal vehicle dynamics of the vehicle in accordance with the calculated likelihood of unplanned disengagement of the driving automation system comprises altering a level of acceleration or deceleration.

In some embodiments, the at least one instance of acceleration or deceleration of the vehicle is based on the traffic contextual data and the calculated likelihood of unplanned disengagement of the driving automation system.

In some embodiments, modulating the longitudinal vehicle dynamics of the vehicle in accordance with the calculated likelihood of unplanned disengagement of the driving automation system comprises altering a number of instances of acceleration or deceleration.

In some embodiments, the number of instances of acceleration or deceleration is based on the traffic contextual data and the calculated likelihood of unplanned disengagement of the driving automation system.

In some embodiments, the traffic contextual data includes at least one of: data related to the vehicle; data related to other vehicles; and environmental conditions.

According to various embodiments of the disclosed technology, a system for alerting an occupant of a vehicle employing a driving automation system, the system can comprise: a controller for vehicle longitudinal dynamic; a processor; and a memory coupled to the processor to store instructions, which when executed by the processor, cause the processor to perform operations, the operations comprising; receiving traffic contextual data; calculating a likelihood of unplanned disengagement of the driving automation system based on the traffic contextual data; and alerting an occupant of the unplanned disengagement of the driving automation system by modulating longitudinal vehicle dynamics of the vehicle in accordance with the calculated likelihood of unplanned disengagement of the driving automation system.

In some embodiments, modulating the longitudinal vehicle dynamics comprises at least one instance of acceleration or deceleration of the vehicle.

In some embodiments, modulating the longitudinal vehicle dynamics of the vehicle in accordance with the calculated likelihood of unplanned disengagement of the driving automation system comprises altering a level of acceleration or deceleration.

In some embodiments, the at least one instance of acceleration or deceleration of the vehicle is based on the traffic contextual data and the calculated likelihood of unplanned disengagement of the driving automation system.

In some embodiments, modulating the longitudinal vehicle dynamics of the vehicle in accordance with the calculated likelihood of unplanned disengagement of the driving automation system comprises altering a number of instances of acceleration or deceleration.

In some embodiments, the system further comprises: an antenna configured to communicate with a wireless network; wherein the traffic contextual data includes at least one of: data related to the vehicle; data related to other vehicles; and environmental conditions.

According to various embodiments of the disclosed technology, a non-transitory machine-readable medium of a vehicle employing a driving automation system, having instructions stored therein, which when executed by a processor, cause the processor to perform operations, the operations can comprise: receiving traffic contextual data; calculating a likelihood of unplanned disengagement of the driving automation system based on the traffic contextual data; and instructing a controller to modulate longitudinal vehicle dynamics of the vehicle in accordance with the calculated likelihood of unplanned disengagement of the driving automation system.

In some embodiments, modulating the longitudinal vehicle dynamics comprises at least one instance of acceleration or deceleration of the vehicle.

In some embodiments, modulating the longitudinal vehicle dynamics of the vehicle in accordance with the calculated likelihood of unplanned disengagement of the driving automation system comprises altering a level of acceleration or deceleration.

In some embodiments, the at least one instance of acceleration or deceleration of the vehicle is based on the traffic contextual data and the calculated likelihood of unplanned disengagement of the driving automation system.

In some embodiments, modulating the longitudinal vehicle dynamics of the vehicle in accordance with the calculated likelihood of unplanned disengagement of the driving automation system comprises altering a number of instances of acceleration and deceleration.

In some embodiments, the traffic contextual data includes at least one of: data related to the vehicle; data related to other vehicles; and environmental conditions.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
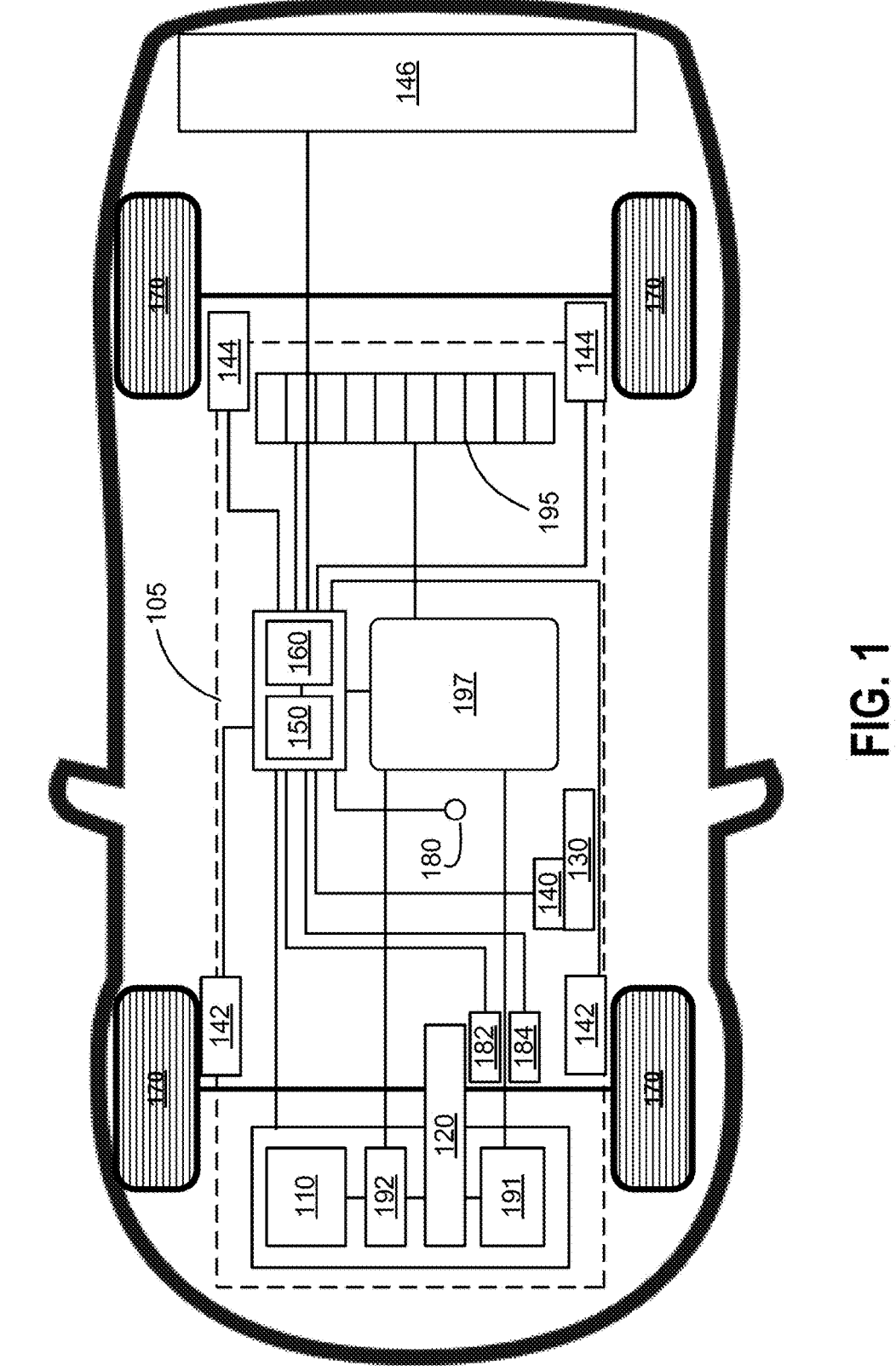
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

Driving automation system controlled vehicles are able to recognize upcoming events (e.g., sensor damage, sudden traffic, weather impediments). However, driving automation system controls are typically too passive to navigate such upcoming events. In these conditions, the vehicle must lower its level of autonomous driving and relinquish operational control to the driver. This often requires occupants to be prepared to assume driving roles on short notice. However, occupants become increasingly inattentive as the driving automation system assumes more driving roles. This phenomenon has led to a need for innovative ways to raise occupant awareness so the driving automation system may relinquish driving roles to the occupant safely. While the embodiments disclosed herein may be thought of in the context of an event forcing the driving automation system to relinquish roles that may be traditionally categorized under L2, the disclosed systems and methods may be applied in any context where the occupants of the vehicle must assume driving roles.

Embodiments of the systems and methods disclosed herein may be configured to alert the occupant(s) of a vehicle of an unplanned disengagement of a driving automation system through modulation of longitudinal vehicle dynamics (LVD).

Driving automation systems can be used in a vehicle that at least, in part, controls or manages vehicle operation to provide varying levels of automated control or assistance. For ease of reference, the term "autonomous control" will be used herein to refer to such systems. In some vehicles, an override mechanism, such as an override switch, may be used to turn off or disengage a vehicle's autonomous control system. Such an override mechanism can allow the occupant(s) to assume manual control of a vehicle. However, when invoking conventional implementations of override mechanisms in a safety scenario (e.g., to avoid a collision), the occupant(s) still must engage in a human/manual situational assessment, and intervention/overriding autonomous control still involves human reaction time. To minimize the risk from errors that can occur during the human/manual situational assessment, based on data gathered from network services and from sensors both internal and external to the vehicle, the car may calculate a likelihood of unplanned disengagement and forewarn the occupant(s) of the need to be prepared to assume driving roles.

Accordingly, various embodiments are directed to systems and methods that forewarn the occupant(s) of unplanned disengagement and the implied need for driver preparedness. Disclosed methods to warn the driver include at least modulating the LVD.

The method and system disclosed herein uses inertial forces as the mode of communication. Conventional vehicles present alerts to occupant(s) using visual cues, auditory signals, such as beeping sounds, and vibrational feedback, through steering wheel or seat rumbles. However, unlike conventionally-implemented vehicular alerts, the disclosed systems and methods modulate LVD to alert the occupant(s) of some unplanned (impending) disengagement. In particular, modulation of LVD may comprise an instance(s) of acceleration or deceleration of the vehicle to alert the occupant(s) of unplanned disengagement and the implied need for driver preparedness. The alert is felt by the occupant(s) through inertial forces (being held back by the seatbelt or pushed into the seat) generated due to the acceleration or deceleration of the vehicle. Acceleration or deceleration of the vehicle may be achieved using any component capable of accelerating or decelerating the vehicle. Acceleration may be applied by either a motor or an internal combustion engine. Similarly, deceleration may be applied by hydraulic braking, either caliper or drum, regenerative braking through motors, engine braking through the internal combustion engine or through aerial braking using air control surfaces such as a spoiler. In some embodiments, the level or magnitude of modulation of LVD may be premised or based on the urgency of the hazardous situation. For example, the magnitude of modulation of LVD may be increased in accordance with greater immediacy of an upcoming event.

There are multiple benefits in alerting the occupant(s) through modulation of LVD. Studies suggest that occupant(s) awareness declines with increasing reliance on driving automation systems. That is, the more an occupant(s) relies on driving automation systems, the less attention that occupant(s) gives to vehicle operation. For example, drivers have been known to watch videos with earphones while operating under driving automation systems. This level of inattentiveness makes other forms of notification (such as sound or visual cues) ineffective. In such a scenario, the occupant(s)' vision/hearing are, in effect, compromised because the occupant is focused on watching videos and his/her eyes and ears are "occupied." However, despite having comprised vision and hearing, an occupant would still be able to recognize, e.g., physically feel, inertial forces resulting from the modulation of LVD.

Another benefit realized by embodiments of the disclosed technology is the ability to notify the occupant(s) of different types of events. Such a benefit is made possible from different characteristics, e.g., different magnitude/direction/pattern or any combination thereof, of LVD modulation, which corresponds with different types of events. As previously stated, the urgency of the unplanned disengagement may dictate/be the basis for (or at least affect) the magnitude of LVD modulation applied. For example, a greater likelihood of unplanned disengagement may result in a greater rate of deceleration as compared to a less likelihood of unplanned disengagement. In some embodiments, the type of modulation of LVD (acceleration or deceleration) may depend on the immediacy or the type of event. For example, the vehicle will opt to decelerate rather than accelerate when it quickly approaches a stopped vehicle on a freeway. In other situations, the vehicle may opt to exert a pulse of LVD modulation, which is a pattern of LVD modulation wherein both types of modulation of LVD are used within a single alert. The pulse may be a momentary acceleration followed by deceleration to the cruising speed or a momentary deceleration followed by acceleration to the cruising speed. This pattern may be used in situations where slowing the vehicle may be unwanted or dangerous, such as when an event where a blaring emergency vehicle is trying to pass the vehicle. In some embodiments, modulation of LVD may be applied through a multitude of pulses. For example, two pulses of LVD modulation may be a fixed deceleration, acceleration back to a cruising speed, application of the same fixed deceleration and finally re-accelerating to the cruising speed. In some embodiments, the applied modulation of LVD may be to a rhythmic pattern that correlates with the event. The pattern of LVD modulation can be programmed to reflect different types of events. For example, a two pulse per second pattern for three cycles may signify unplanned disengagement due to upcoming traffic. The pattern of LVD modulation may also include multiple instances of only deceleration or acceleration. Here, the vehicle may undergo multiple instances of deceleration without instances of acceleration in between instances of deceleration or multiple instances of acceleration without instances of deceleration in between instances of acceleration.

The systems and methods disclosed herein may process data from a variety of sources to calculate a likelihood of unplanned disengagement. Sources of data may include sensors in the vehicle (e.g. wheel spin sensors, LIDAR sensors, clearance sensors, cameras), sensors in other vehicles, sensors on infrastructure (e.g. lane occupancy magnetometers, radar sensors), and databases (e.g. mapping databases, weather forecasts, traffic reports). In some embodiments, these sources of data may be delivered to processors via wired connections. In some embodiments, these sources of data may be delivered to processors wirelessly. In some embodiments, these sources of data may be delivered to processors over a network. The processors which calculate the likelihood of unplanned disengagement from the data may be present on the vehicle itself, or present elsewhere. The processors may calculate the likelihood of unplanned disengagement from the data and in some embodiments transmit the resulting likelihood of unplanned disengagement to the vehicle via a wired connection. In some embodiments, likelihood of unplanned disengagement is transmitted to the vehicle via a wireless connection. In some embodiments the resulting likelihood of unplanned disengagement is transmitted to the vehicle over a network.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types. An example hybrid electric vehicle (HEV) in which embodiments of the disclosed technology may be implemented is illustrated and described below as one example, but the hybrid electric nature of the vehicle is not necessary for the operation of the disclosed technology, nor is it limiting on the disclosed technology.

FIG. 1 is a schematic representation of an example vehicle with which embodiments of the systems and methods disclosed herein may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode (also referred to as regenerative braking). The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed (NE) of engine 110 independently of the vehicle speed (V).

ECU 150 may include circuitry to control the above aspects of vehicle operation. ECU 150 may include, for example, a microcomputer that includes one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG 191. It should be understood that in embodiments where MGs 191, 192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Brake assemblies 142 and 144 are brakes suitable for HEVs. Brake assemblies 142 and 144 may be controlled by ECU 150 or by the driver through brake pedal 130 and brake pedal sensor 140. Brake assemblies 142 and 144 may be of different types. For example, the front brake assemblies 142 may be of disc type (e.g., caliper with brake pads and rotor in between) and the rear brake assemblies 144 may be of drum type (e.g., brake shoes within a drum housing). Braking signal can be distributed evenly among brake assemblies 142 and 144 or have uneven distribution. For example, brake assemblies 142 may endure 80% of the braking force, while brake assemblies 144 may endure 20% of the braking force.

Brake inputs from brake pedal 130 may also result in activation of air brake 146. Air brake 146 may consist of a single aerodynamic control surface, or may include multiple control surfaces, which may include only of a rear spoiler, but may also include a front splitter (not shown), scoops (not shown), or other panels or ducts that will increase the drag coefficient of the vehicle.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2A:
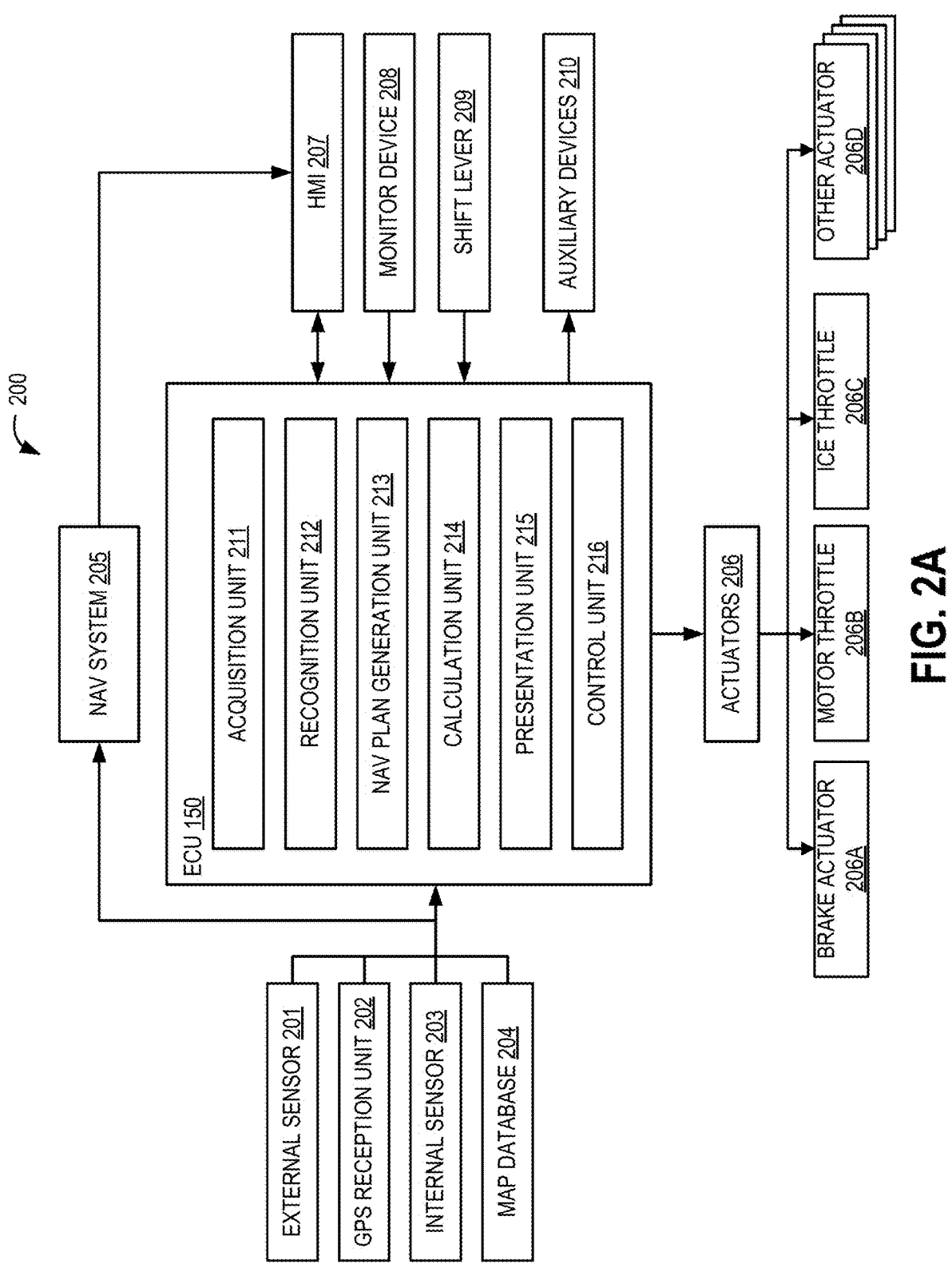
FIG. 2A illustrates an example autonomous control system.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a determined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In a driving automation system context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver. It should be understood that in such scenarios, use of influential control over a driver's steering hand(s), because a driver is already engaging in a "proper" operation, may enforce or positively reinforce the driver's action(s).

In the example shown in FIG. 2A, autonomous control system 200, external sensor 201, a GPS (Global Positioning System) reception unit 202, an internal sensor 203, a map database 204, a navigation system 205, actuators 206, an HMI (Human Machine Interface) 207, a monitor device 208, a shift lever 209, and auxiliary devices 210 are provided. Autonomous control system 200 may communicate with ECU 150, or in some embodiments may be implemented with its own ECU.

External sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

Internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, ICE throttle actuator 206C, Motor throttle actuator 206B, brake actuator 206A, and other actuator 206D (one example is a steering actuator). In some embodiments, other actuator 206D includes engine value control to initiate engine braking and MG control to engage regenerative braking. For example, throttle actuator 206C controls, in accordance with a control signal output from the ECU 150, an amount by which to open the throttle of HEV 100 to control a driving force (the engine) of HEV 100. In another example, actuators 206 may include Motor Throttle Actuator 206B that that control MGs 191 and 192, where a control signal is supplied from the ECU 150 to MGs 191 and/or 192 to output motive force/energy. Brake actuator 206A controls, in accordance with a control signal output from the ECU

150, the amount of braking force to be applied to each wheel of the vehicle. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and actuation mechanisms, such as buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit

214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Figure 2B:
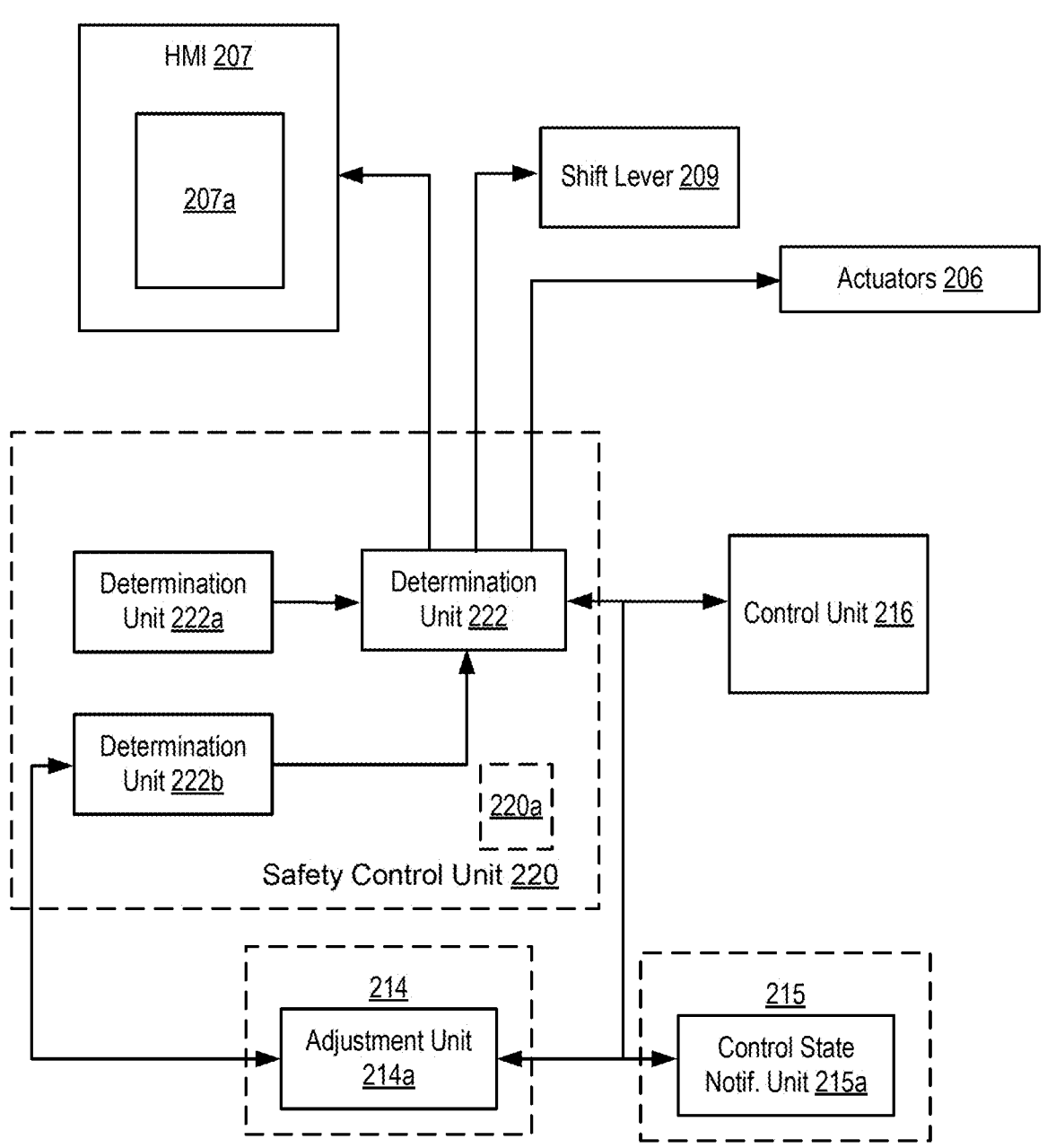
FIG. 2B illustrates an example safety control unit aspect of the autonomous control system of FIG. 2A.

Referring to FIG. 2B, control unit 216 operatively interacts with safety control unit 220 that determines whether or not autonomous control system 200 (in particular, control unit 216) can engage (e.g., activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based. Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215a that notifies the driver of a fact that HEV 100 is operating under autonomous control is in execution, and so forth. Such a notification may be displayed on a display of HMI 207, for example. Like-wise, If a switch from autonomous control to the manual control is executed, the control state notification unit 215a displays, on the display of HMI 207 a corresponding noti-fication.

HMI 207, in some embodiments, may include an autono-mous control engagement trigger input unit 207a that can be actuated by the driver of HEV 100 to engage in an autono-mous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3:
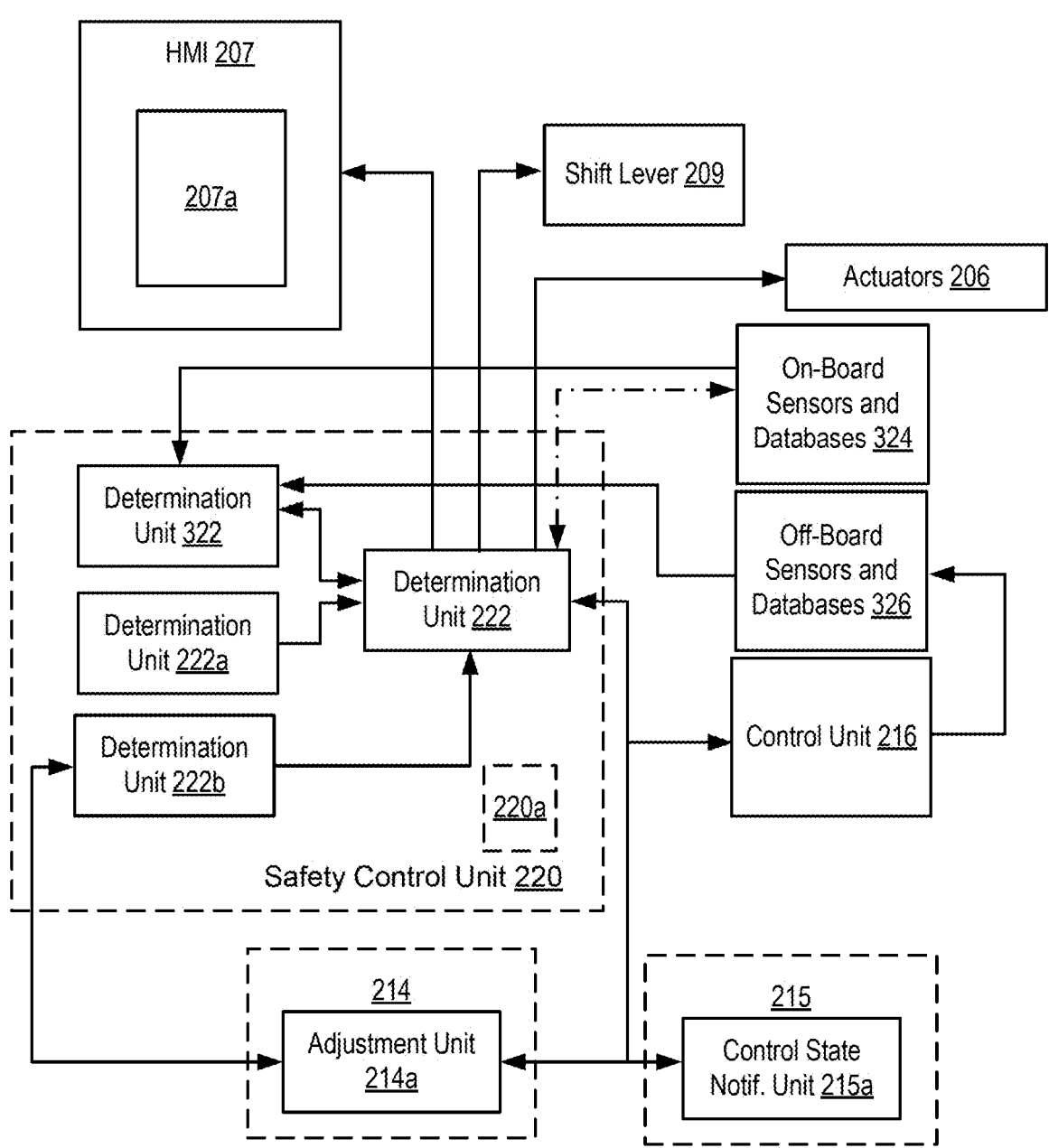
FIG. 3 illustrates one example implementation of a system which alerts vehicle occupant(s) of a likelihood of unplanned disengagement of driving automation systems.

As alluded to above, a modulation of LVD may be triggered in order to alert the occupant(s) of HEV 100 that circumstances have raised the likelihood of an unplanned disengagement of autonomous control system 200. FIG. 3 illustrates an example implementation a system which gen-erates alerts regarding the likelihood of unplanned disen-gagement. That is, in addition the above-described compo-nents and functionality of autonomous control system 200, FIG. 3 includes vehicle sensors and systems 326 and cloud network 324 that are connected to determination unit 322, which in turn is operatively connected to determining unit 222.

Figure 4:
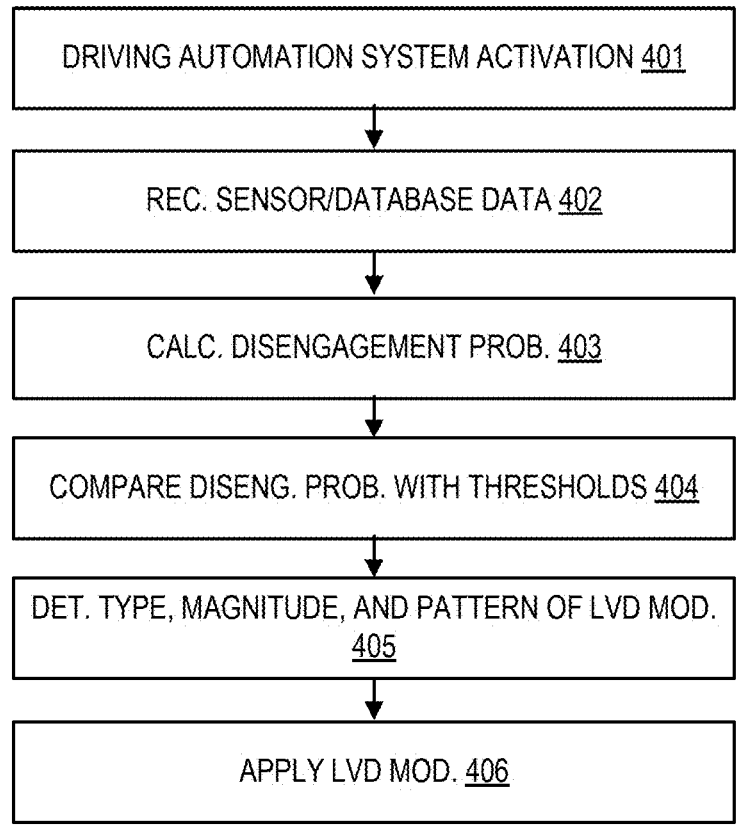
FIG. 4 Illustrates one example method which alerts vehicle occupant(s) of a likelihood of unplanned disengagement of driving automation systems by way of modulating longitudinal vehicle dynamics.

Determination unit 322, like the other determination units 222, 222a, and/or 222b, may comprise logic, circuitry, software, or some combination thereof determine when an alert relating to likelihood of unplanned disengagement should be raised. FIG. 4 is a flow chart illustrating one embodiment of a likelihood of unplanned disengagement alert method. Such a method determines when an alert relating to a likelihood of unplanned disengagement should be raised, and effectuating that alert by modulating the LVD. FIG. 3 and FIG. 4 illustrate how conditions that effectuate an increased likelihood of unplanned disengagement may be handled by the components of the likelihood of unplanned disengagement alert system.

As an initial consideration, in some embodiments, deter-mination unit 322 does not proceed unless the driving automation system has been activated. This functionality is enacted by determination unit 322 reading signals sent from control unit 216 to see if control unit 216 is commanding movement of HEV 100. For example, determination unit 322 may be embedded with instructions that upon receiving a signal or notification of control unit 216 engaged in the driving automation system, will go into an active wait state wherein the alert system methods may proceed. Once determination unit 322 has entered an active wait state, the likelihood of unplanned disengagement alert system has reached the driving automation system activation operation 401 in the disclosed likelihood of unplanned disengagement alert method. Upon receipt of a signal or notification of control unit 216 discontinuing the driving automation sys-tem movement of HEV 100, determination unit 322 will go into an inactive wait state and wait until receipt of another signal or notification of the driving automation system reengagement.

At operation 402, determination unit 322 accepts data from at least one of the on-board sensors and databases 324 and off-board sensors and databases 326. On-board sensors and databases 324 includes any sensors or database housed on the vehicle. On-board sensors and databases 324 may include, but is not limited to, any of the previously discussed internal sensors 201, GPS reception unit 202, internal sensor 203, and map database 204. Off-board sensors and databases 326 may include any sensor or database not housed on the vehicle, with the associated data communicated to compo-nents of safety control unit 220 and/or control unit 216 via wired or wireless connections. In some embodiments one or more off-board sensors and databases 326 may communicate their data to components of safety control unit 220 and/or control unit 216 via a network connection. Off-board sensors and databases 326 may include, but is not limited to, sensors and databases analogous to the on-board sensors and data-bases 324, but housed on a different vehicle. Off-board sensors and databases 326 may also include sensors and databases connected to a server, (e.g. a weather reporting service, a traffic reporting service, a global positioning service, a cloud data storage service), as well as sensors and databases connected to infrastructure (e.g. a radar device on a speed sign or a red-light camera on a traffic light). Upon receipt of data from the on-board sensors and databases 324 and/or the off-board sensors and databases 326, the deter-mination unit has completed operation 402.

At operation 403, determination unit 322, uses the received data to calculate the likelihood of unplanned dis-engagement. In many embodiments, the likelihood of unplanned disengagement formula is a pre-coded formula, wherein the formula is regulated by the manufacturer through vehicle system update. In other embodiments, a driver selected formula is used, where the driver selects the priority of numerous data characteristics (e.g., driver can select certain conditions, such as upcoming road hazard, as a high priority, which implies an upcoming road hazard will result in heightened likelihood of unplanned disengage-ment). The formula may also contain factory programmed settings that cannot be altered by the driver. For instance, the driver may be incapable of changing the value for tire system faults. In some embodiments, the vehicle is coded with artificial intelligence, where the determination unit 322, by training itself, can improve the accuracy of its formulae for calculating unplanned disengagement probabilities. In some embodiments, training is carried out by measuring inaccuracy based on explicit driver feedback (through driver interface) or through actual occurrences of an unplanned driving automation system disengagement not matching with calculated unplanned disengagement probabilities.

In some embodiments, after the likelihood of unplanned disengagement has been calculated, the determination unit 322 sends the calculated likelihood of unplanned disengage-ment to determination unit 222 and continues on to opera-tion 404. Meanwhile, determination unit 222 checks to determine if the driving automation system was deactivated. More specifically, the determination unit 222 awaits for driving automation system deactivation, reported through control unit 216. Whether an unplanned driving automation system disengagement actually followed the reported likelihood of unplanned disengagement is saved as feedback data on a database. This database may be present in on-board sensors and databases 324 or in off-board sensors and databases 326. This feedback data may be referenced in later iterations of the likelihood of unplanned disengagement alert method to measure the accuracy of likelihood of unplanned disengagement calculation formulae.

After calculating a likelihood of unplanned disengagement, determination unit 322 will compare the calculated likelihood of unplanned disengagement with a threshold value, reference operation 404. The threshold value may be assigned by the manufacturer. In some embodiments, the driver is able to lower the threshold value, thereby increasing the likelihood for LVD modulation. In some embodiments, any indication of fault from sensor or vehicle system would result in triggering any threshold value. in these embodiments, the sensor or system fault would override the need for calculating the likelihood of unplanned disengagement and proceed to operation 405. In some embodiments, whether the threshold value is reached is based on cumulative disengagement probability. In other embodiments, specific data types may automatically meet one or more thresholds. An example case is where traffic reporting service reports an upcoming accident, which automatically results in a probability value above the threshold value.

The calculated likelihood of unplanned disengagement is next used to determine the characteristic of LVD modulation at operation 405. In some embodiments, a greater likelihood of unplanned disengagement corresponds to a greater magnitude of LVD modulation. For instance, a sudden detection of an obstacle in the road may result in a likelihood of unplanned disengagement calculation high enough to call for aggressive braking, while detection of a light rain miles down the road may result in a likelihood of unplanned disengagement calculation low enough to call for smooth or gradual braking. In some embodiments, as alluded to above, various scenarios are assigned different characteristics, which includes various combinations of magnitudes, types, and patterns of LVD modulation. Different types may refer to a selection of acceleration or deceleration. Different patterns may refer to the combination of acceleration and deceleration with the number of pulses of LVD modulation. For example, the driver may assign three rhythmic cycles of deceleration and acceleration at half-second pulses to signify an upcoming collision.

Instructions to carry out the determined characteristic of LVD modulation are presented to actuators 206 at operation 406. In some embodiments, the determined characteristics of LVD modulation is applied by determination unit 322 sending the determined characteristics of LVD modulation to determination unit 222 wherein determination unit 222 factors in outputs from determination units 222a-b and safety concerns before deciding to pass the instruction on to control unit 216. Determination unit 222 may account for safety concerns by, for instance, checking on-board sensors and databases 326, off-board sensors and databases 328, for indication of nearby vehicles to reduce the risk of accidents during LVD modulation. Control unit 216 then converts the instructions into outputs signals to the brake actuator 206A, the motor throttle 206B, and the ICE throttle 206C. The output signals cause the associated actuators to execute the determined characteristics of LVD modulation and alert the occupant(s) of the associated likelihood of unplanned disengagement scenario.

Figure 5:
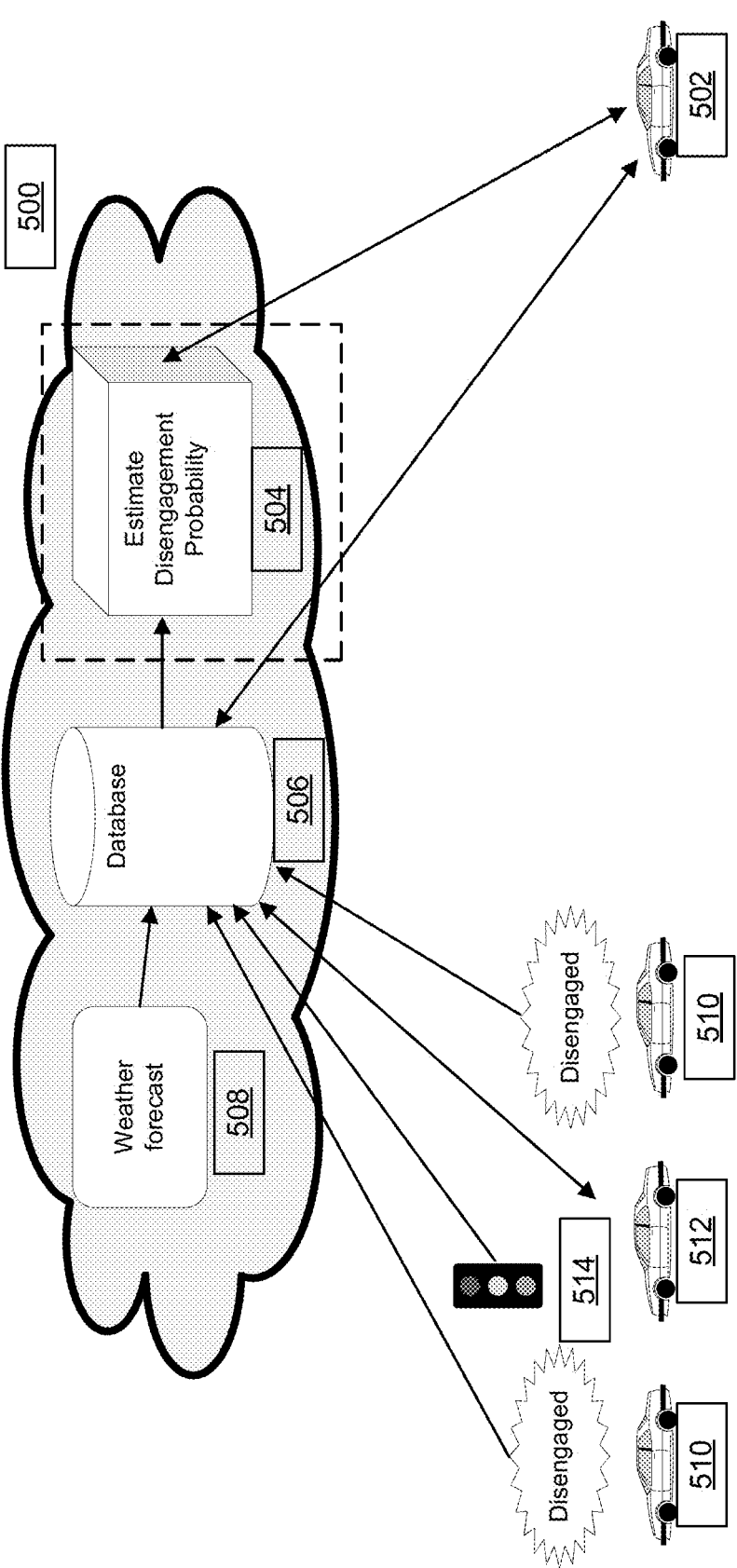
FIG. 5 illustrates an example network that may be formed by the utilization of the disclosed likelihood of unplanned disengagement alert system and methods.

FIG. 5 illustrates an example system network that may be formed by the utilization of the disclosed likelihood of unplanned disengagement alert systems and methods. In one embodiment, subject vehicle (referring to vehicle 502), will send a signal of driving automation system activation to network cloud 500. After which, network cloud 500 gathers relevant data from database 506 and returns the relevant data to subject vehicle 502. Database 506 stores information relevant to subject vehicle 502, which may include weather forecast 508, which is taken from the internet (not shown), unplanned driving automation system disengagement activities of upcoming vehicles 510, lack of an unplanned the driving automation system disengagement activity of upcoming vehicles 512, or various traffic sensors 514. Subject vehicle 502 then calculate its likelihood of unplanned disengagement using its on-board systems. In other embodiments, network cloud 500 will estimate the likelihood of unplanned disengagement 504 for subject vehicle 502 and the likelihood of unplanned disengagement is transmitted to subject vehicle 502. In some embodiments, the characteristic of LVD modulation is calculated within the cloud 500 and transmitted to subject vehicle 502.

Figures 6A, 6B, 6C:
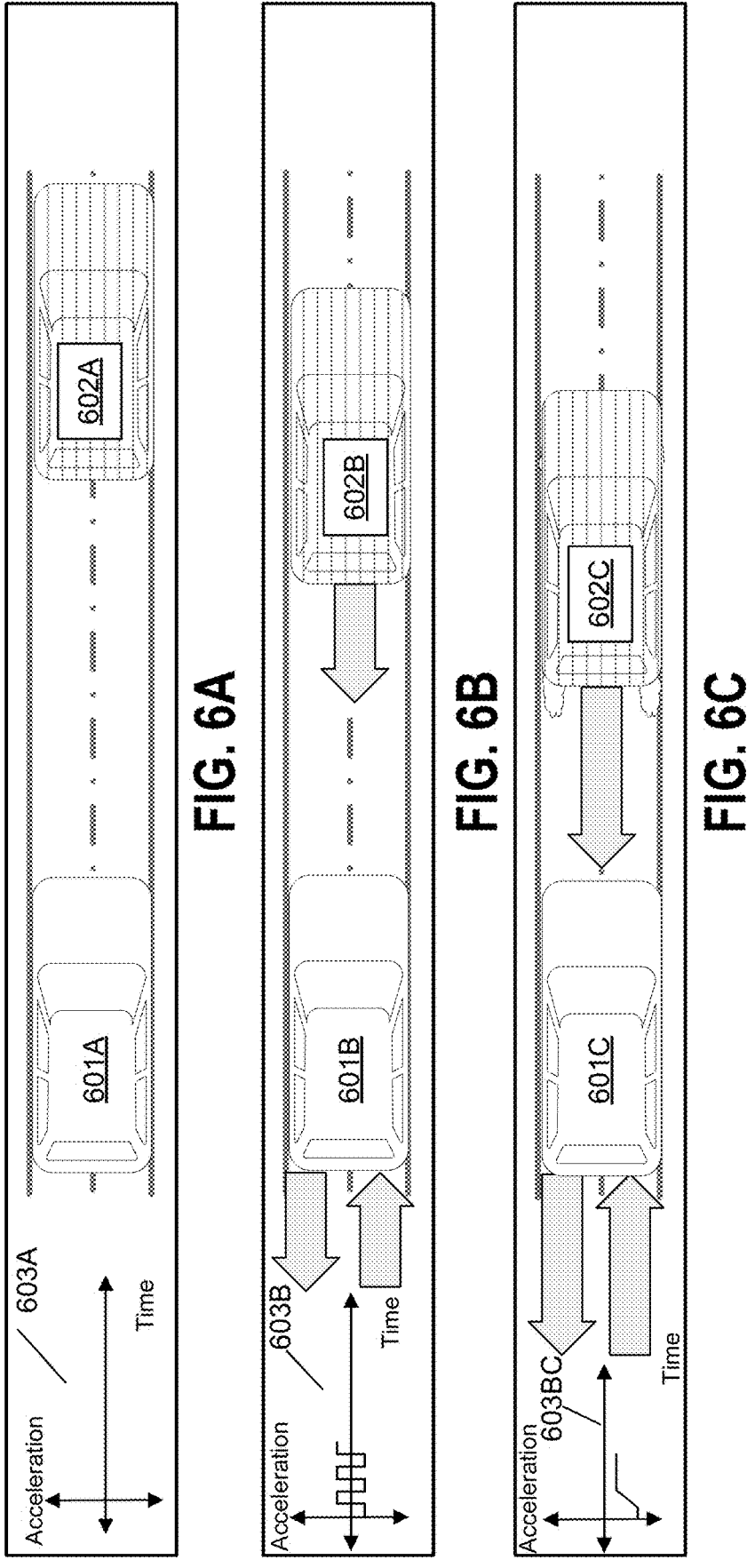
FIGS. 6A-C illustrate multiple scenarios of varying likelihood of unplanned disengagement to show how modulation of longitudinal vehicle dynamics change based on various situations.

FIG. 6A-C illustrates how LVD modulation may be scaled based on increasing likelihood of unplanned disengagement. FIG. 6A depicts a scenario where a subject car 601A deploying an embodiment of the invention disclosed herein may react to a likelihood of unplanned disengagement calculated based on a detected lead car 602A traveling at roughly the same speed as the subject car 601A. The subject car 601A collects data from the above disclosed sensors and databases and detects that the lead car 602A ahead is not being operated in a way to close the distance between the two cars. Based on this, the subject car 601A calculates a likelihood of unplanned disengagement below any threshold meant to trigger an LVD modulation to warn the driver. As a result, no modulation of LVD is applied to the subject car 601A. Acceleration over time plot 603A is shown to emphasize the lack of changes to the vehicle's acceleration.

FIG. 6B depicts a scenario where a subject car 601B reacts to a likelihood of unplanned disengagement calculated based on a detected lead car 602B braking slightly such that the lead car 602B appears, relatively speaking, to begin approaching subject car 601B. The subject car 601B collects data from the above disclosed sensors and databases and detects that the lead car 602B ahead is being operated in a way to close the distance between the two cars. Based on this, the subject car 601B calculates a likelihood of unplanned disengagement at a first threshold meant to trigger an LVD modulation to warn the driver. As a result, the corresponding graph of acceleration versus time 603B shows an application of a pattern of acceleration that alerts the occupant(s) of the subject car 601B of a raised chance that they may be required to assume driving roles. As a result, modulation of LVD is applied to the subject car 601B. Acceleration over time plot 603B is shown to emphasize the changes to the vehicle acceleration over time.

FIG. 6C depicts a scenario where a subject car 601C reacts to a likelihood of unplanned disengagement calculated based on a detected the lead car 602C braking harshly such that the lead car 602C appears, relatively speaking, to be approaching the subject car 601C at a rapid pace. The subject car 601C collects data from the above disclosed sensors and databases and detects that the lead car 602C ahead is being operated in a way to rapidly close the distance between the two cars. Based on this, the subject car 601C calculates a likelihood of unplanned disengagement meant to trigger an aggressive LVD modulation characteristic to warn the driver. The subject car 601 is also aware that any application of acceleration at this moment may compromise safety. As a result, the corresponding graph of acceleration over time 603C shows that the vehicle suddenly and rapidly applied negative acceleration/deceleration, alerting the occupants of subject car 601C of a high chance that they will be required to assume driving roles. In some embodiments, LVD modulation is trumped by a different system. Systems such as an automatic emergency braking (AEB) system may activate the brakes to slow a vehicle prior to impact or bring it to a stop to avoid a collision. The situation depicted on FIG. 6C does not allow the likelihood of unplanned disengagement alert system to cooperate with the AEB system because the safety of the vehicle is prioritized over notifying the occupant(s) of an unplanned disengagement of the driving automation system. Therefore, in situations such as these, the measured acceleration over time 603C may be a product of the AEB system activation rather than the likelihood of unplanned disengagement system.

Figure 7B:
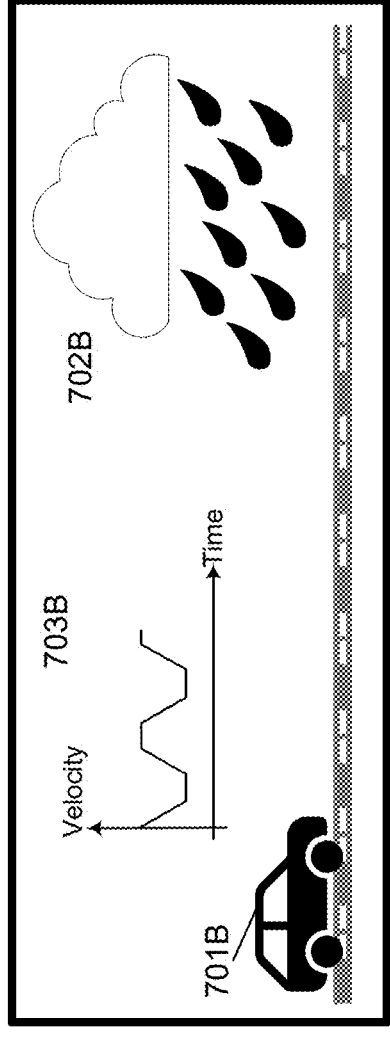
FIGS. 7A-C illustrate multiple scenarios that may trigger unplanned disengagement of driving automation systems.
Figure 7C:
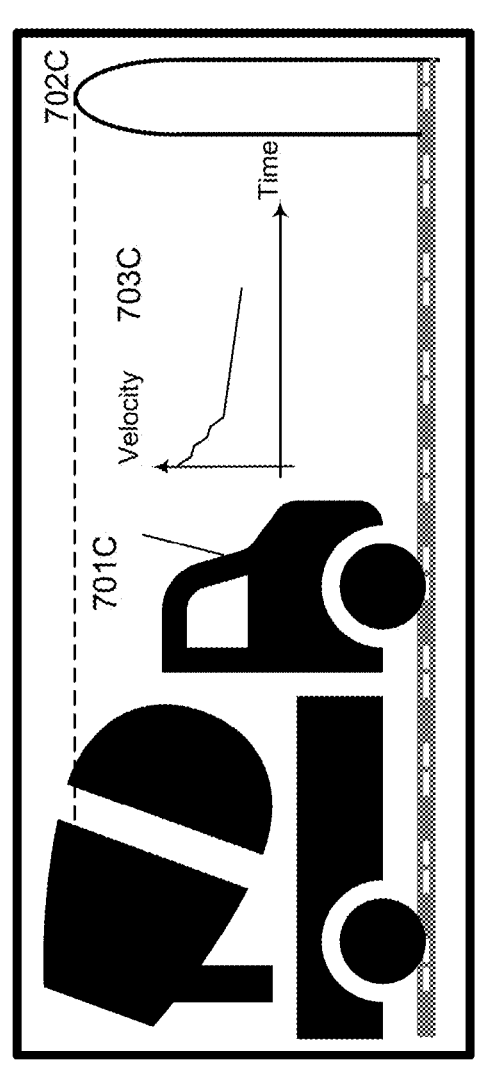
Figure 7A:
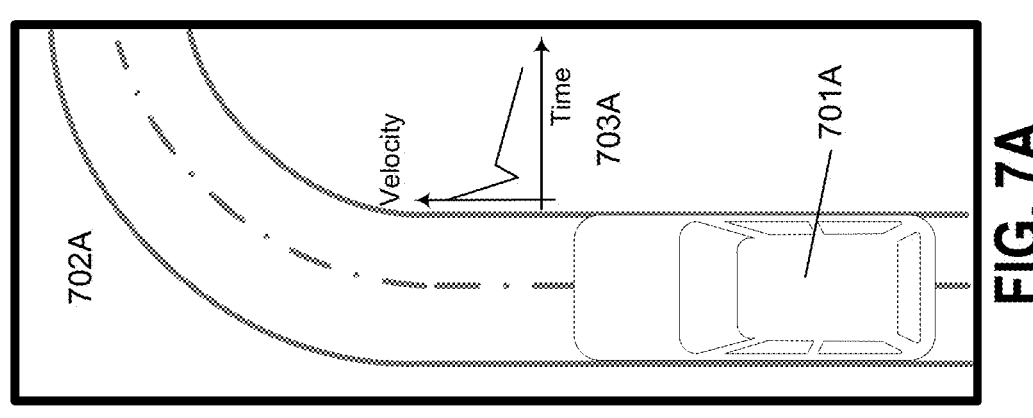

FIGS. 7A-C illustrate how the characteristics of LVD modulation alerts may be tailored to specific sources of raised likelihood of unplanned disengagement. FIG. 7A depicts a scenario where subject car 701A deploying an embodiment of the invention disclosed herein may react to a likelihood of unplanned disengagement calculated based on a detected upcoming road geometry 702A requiring a sharp right turn of the subject car 701A. Subject car 701A collects data from the above disclosed sensors and databases and detects that the upcoming road geometry 702A requires a turn too sharp for the driving automation system to handle. The likelihood of unplanned disengagement alert system also recognizes its need to cooperate with the driving automation system. Based on this, subject car 701A determines a characteristic of LVD modulation as depicted on velocity versus time chart 704C alerting both the likelihood of unplanned disengagement and the source of the raised likelihood of unplanned disengagement. As a result, the likelihood of unplanned disengagement alert system excessively slows the vehicle to a speed determined as safe by the driving automation system and accelerates to a safe speed.

FIG. 7B depicts a scenario where subject car 701B deploying an embodiment of the invention disclosed herein may react to a likelihood of unplanned disengagement calculated based on a detected rainstorm 702B indicating wet road ahead. Subject car 701B collects data from the above disclosed sensors and databases and detects that the upcoming rain storm 702B and the resulting wettened roads raise the likelihood of unplanned disengagement. Based on this, subject car 701B determines that a characteristic of LVD modulation of two pulses that smoothly adjust the speed of the vehicle is sufficient to alerting occupant(s) of the relative likelihood of unplanned disengagement and the source of the raised likelihood of unplanned disengagement. Velocity versus time chart 704B indicates a potential pulse pattern of LVD modulation. In some embodiments, the magnitude and/or frequency of the secondary oscillation may further be increased to communicate to scale with an increasing likelihood of unplanned disengagement.

FIG. 7C depicts a scenario where subject truck 701C deploying an embodiment of the invention disclosed herein may react to a likelihood of unplanned disengagement calculated based on a detected upcoming tunnel 702C, wherein the upcoming tunnel 702C is at a height insufficient for the subject truck 701C to pass through. Subject truck 701C collects data from the above disclosed sensors and databases and detects that the upcoming tunnel 702C cannot be navigated by the driving automation system. Based on this, subject truck 701C determines an LVD modulation characteristic as depicted on velocity versus time plot 703B that both slows the subject truck 701C while also alerting the occupant(s) of the high likelihood of unplanned disengagement and the source of the raised likelihood of unplanned disengagement. Similar to the scenario depicted on FIG. 6C, the AEB system may override the alerting system to stop subject truck 701C from colliding into the upcoming tunnel 702C.

Figure 8:
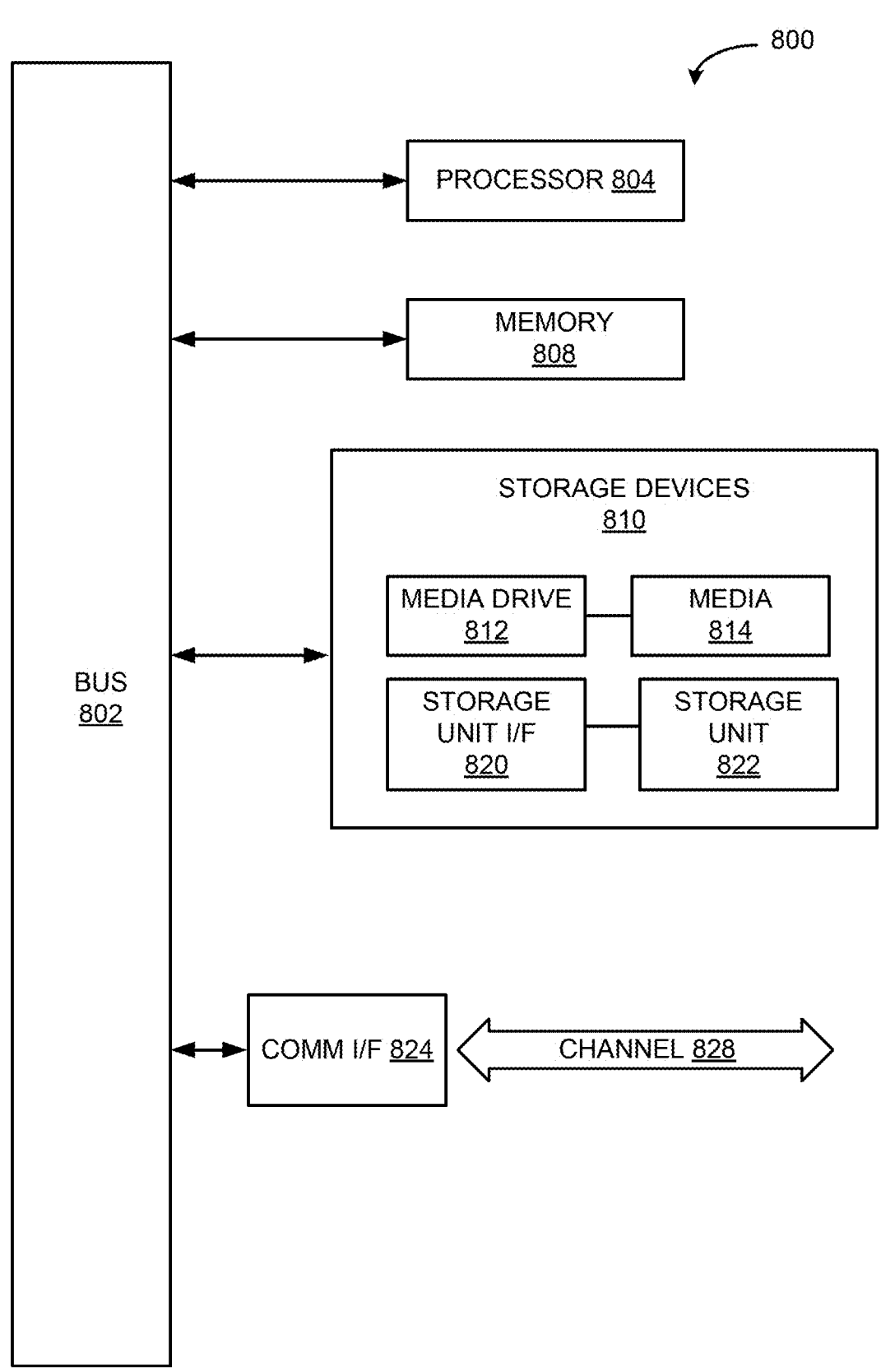
FIG. 8 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of alerting an occupant of a vehicle employing a driving automation system, the method comprising:

calculating a magnitude of a likelihood of future unplanned disengagement of the driving automation system based on traffic contextual data; and alerting the occupant of the likelihood of future unplanned disengagement of the driving automation system by at least one pulse of longitudinal vehicle dynamics modulation, the at least one pulse comprising at least one of an instance of acceleration followed by deceleration of the vehicle, or an instance of deceleration followed by acceleration of the vehicle;

wherein:

a level of acceleration or deceleration for the least one pulse scales with the calculated magnitude of the likelihood of future unplanned disengagement of the driving automation system; or the at least one pulse comprises a plurality of pulses and a frequency of the plurality of pulses scales with the calculated magnitude of the likelihood of future unplanned disengagement of the driving automation system.

2. The method of claim 1, wherein the at least one pulse of longitudinal vehicle dynamics modulation is determined further based on the traffic contextual data.

3. The method of claim 1, wherein:

the at least one pulse comprises a plurality of pulses; and the modulation characteristic comprises a pattern of the plurality of pulses.

4. The method of claim 1, wherein the traffic contextual data includes at least one of:

data related to the vehicle;

data related to other vehicles; and environmental conditions.

5. A system for alerting an occupant of a vehicle employing a driving automation system, the system comprising:

one or more processors; and memory coupled to the one or more processors to store instructions, which when executed by the one or more processors, cause the system to perform operations, comprising:

calculating a magnitude of a likelihood of future unplanned disengagement of the driving automation system based on traffic contextual data; and alerting the occupant of the likelihood of future unplanned disengagement of the driving automation system by at least one pulse of longitudinal vehicle dynamics modulation, the at least one pulse comprising at least one of an instance of acceleration followed by deceleration of the vehicle, or an instance of deceleration followed by acceleration of the vehicle;

wherein:

a level of acceleration or deceleration for the least one pulse scales with the calculated magnitude of the likelihood of future unplanned disengagement of the driving automation system; or the at least one pulse comprises a plurality of pulses and a frequency of the plurality of pulses scales with the calculated magnitude of the likelihood of future unplanned disengagement of the driving automation system.

6. The system of claim 5, wherein the at least one pulse of longitudinal vehicle dynamics modulation is determined further based on the traffic contextual data.

7. The system of claim 5, wherein:

the at least one pulse comprises a plurality of pulses; and the modulation characteristic comprises a pattern of the plurality of pulses.

8. The system of claim 5, further comprising:

an antenna configured to communicate with a wireless network;

wherein the traffic contextual data includes at least one of:

data related to the vehicle;

data related to other vehicles; and environmental conditions.

9. A non-transitory machine-readable medium of a vehicle employing a driving automation system, having instructions stored therein, which when executed by one or more processors, cause the one or more processors to perform operations, the operations comprising:

calculating a magnitude of a likelihood of future unplanned disengagement of the driving automation system based on the traffic contextual data; and instructing a controller to alert an occupant of a vehicle of the likelihood of future unplanned disengagement of the driving automation system by at least one pulse of longitudinal vehicle dynamics modulation, the at least one pulse comprising at least one of an instance of acceleration followed by deceleration of the vehicle, or an instance of deceleration followed by acceleration of the vehicle;

wherein:

a level of acceleration or deceleration for the least one pulse scales with the calculated magnitude of the likelihood of future unplanned disengagement of the driving automation system; or the at least one pulse comprises a plurality of pulses and a frequency of the plurality of pulses scales with the calculated magnitude of the likelihood of future unplanned disengagement of the driving automation system.

10. The non-transitory machine-readable medium of claim 9, wherein the at least one pulse of longitudinal vehicle dynamics modulation is determined further based on the traffic contextual data.

11. The non-transitory machine-readable medium of claim 9, wherein the traffic contextual data includes at least one of:

data related to the vehicle;

data related to other vehicles; and environmental conditions.

* * * * *